United States Patent [19]

Huang et al.

[11] Patent Number: 5,673,594

[45] Date of Patent: Oct. 7, 1997

[54] SPEED CHANGE LEVER APPARATUS FOR USE IN BICYCLES

[75] Inventors: Jack Huang, Tainan; Chung-Ping Chiang, Taipai; Chan-Hua Feng, Hsinchu; Yuh-Ming Hwang, Chung-Shing Village, all of Taiwan

[73] Assignee: Industrial Technology Research Institute, Hsinchu, Taiwan

[21] Appl. No.: 582,563

[22] Filed: Jan. 3, 1996

[51] Int. Cl.$^6$ .................... B62M 25/04; B62K 11/14; B62K 23/06
[52] U.S. Cl. .................... 74/475; 74/143; 74/489; 74/502.2
[58] Field of Search .................... 74/142, 143, 475, 74/489, 502.2

[56] References Cited

U.S. PATENT DOCUMENTS

| | | | |
|---|---|---|---|
| 5,020,387 | 6/1991 | Nagano | 74/502.2 X |
| 5,095,768 | 3/1992 | Nagano | 74/489 X |
| 5,203,213 | 4/1993 | Nagano | 74/489 X |
| 5,564,310 | 10/1996 | Kishimoto | 74/489 |

Primary Examiner—Allan D. Herrmann
Attorney, Agent, or Firm—W. Wayne Liauh

[57] ABSTRACT

The present invention relates to a bicycle speed change lever apparatus which is mounted near the handlebar of a bicycle. A lever apparatus is used for pushing a ratchet member, allowing the ratchet member to produce a positive or negative rotation, which further drives a cable-pulling member, thus allowing the cable to be tightened or relaxed by the cable-pulling member to accomplish an in or back shift. A position maintaining mechanism is also provided for effectuating the shift change, and the cable is allowed to maintain a certain amount of tension. The speed change lever apparatus eases the shifting operation and makes the in shift or back shift more precisely controlled.

3 Claims, 9 Drawing Sheets

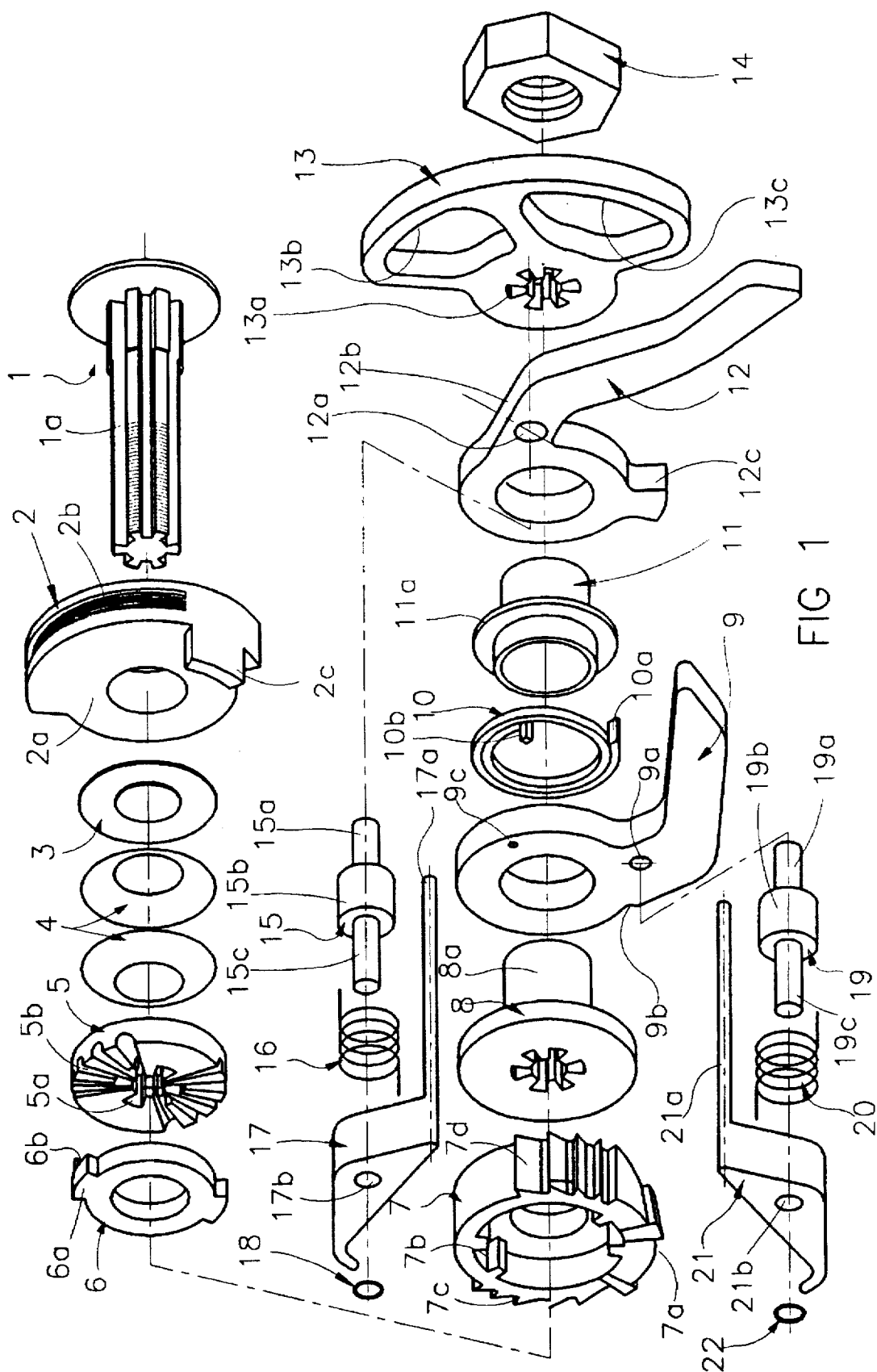

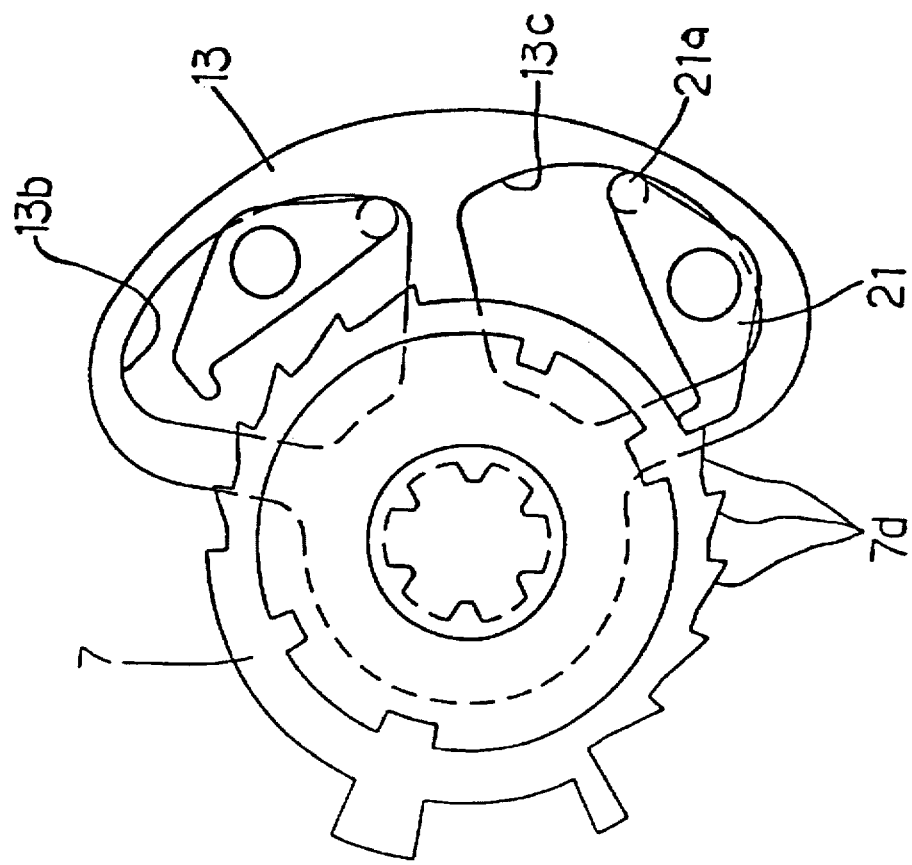
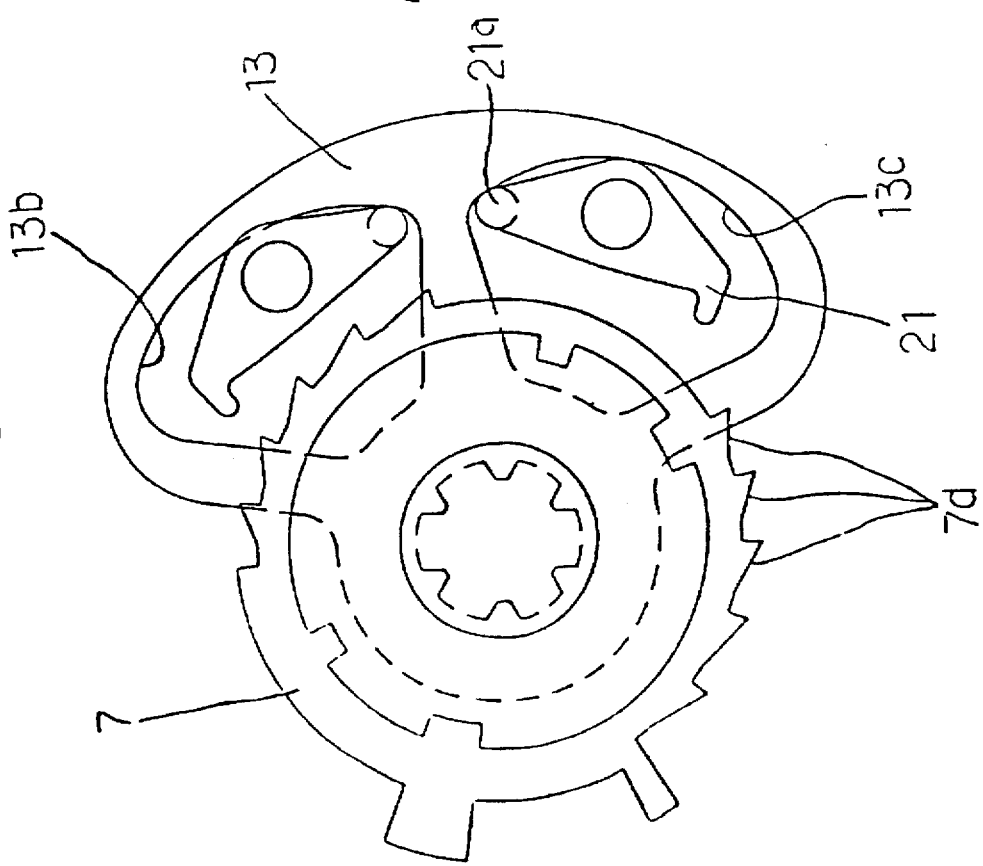

5,673,594

SPEED CHANGE LEVER APPARATUS FOR USE IN BICYCLES

BACKGROUND OF THE INVENTION

The present invention relates to a speed change lever apparatus for use in bicycles which is mounted near the handlebar and is connected to the derailleur by means of a cable in such a manner that the rider can use the cable for tightening or releasing the cable-pulling member by means of the speed change apparatus so as to switch the derailleur and to shift the drive chain from one chainwheel to another chainwheel for accomplishing the purpose of speed change.

The derailleur of a bicycle in general relates to a reciprocal governing lever for linking the cable to drive the derailleur leading the chain deflection to various gears in order to change gear ratios.

Because the operation of the conventional governing lever relates to a direct push of the governing lever to different positions by hand, enabling the derailleur to change to different shifts, and speed change operation is totally manipulated by the operator subject to memory and feeling so that the operator cannot precisely control the location of the governing lever at different positions and can not switch it to the correct shift.

To overcome the aforesaid problems, there are some speed change apparatus in the market which have used a ratchet apparatus as the governing member. The speed change apparatus of this type in general uses a lever for driving a ratchet to push the ratchet gear moving forward and pulling the speed change cable, thus enabling the speed change apparatus to produce a speed change by shift, and a clutch teeth to engage with the ratchet for preventing it from driving negatively by the cable, and for back shift it may use another lever for releasing the clutch teeth, enabling the ratchet to be pulled by the speed change cable in negative way in order to shift back the former shift with the help of recovering force of the speed change apparatus.

Because of the mechanical restriction imposed on the speed change apparatus, during back shifting when the main clutch teeth disengages with the ratchet, the ratchet is caused to move back by one shift, there should need an auxiliary clutch teeth for retaining the ratchet to prevent it from being overdriven by the speed change cable resulting in back shift being out of control so that the operation of back shift only allows one shift back. This causes inconvenience of operation. In addition, for in shift and back shift of the speed change apparatus, the push direction of the lever is the same so it could hardly tell which lever is corresponding to in shift and which to back shift.

Owing to the various factors mentioned above, the conventional speed change apparatus still has many defects relating to operation. In view of this, the inventor has devoted himself to research and successfully developed the present invention through consistent test and improvement based on manufacturing and sale experience in related products over the years.

SUMMARY OF THE INVENTION

One object of the present invention is to provide a speed change lever apparatus for use in bicycles that is labor-saving and convenient for the operation of in and back shifts precisely Another object of the present invention is to provide a bicycle speed change lever apparatus that is to use ratchet control for precise change of shift without skip for in and back shifting.

Still another object of the present invention is to provide a bicycle speed change lever apparatus that is convenient and provides better functioning for operation.

These and other objects and advantages of the present invention will become apparent to those skilled in art after considering the following detailed specification together with the accompanying drawings.

BRIEF DESCRIPTION OF THE DRAWINGS

FIG. 1 is an exploded view of components of the present invention.

FIGS. 8 thru 10 are schematic drawings of continuous position relationship of the present invention for the control of back shift.

DETAILED DESCRIPTION OF PREFERRED EMBODIMENT

Figure 3:
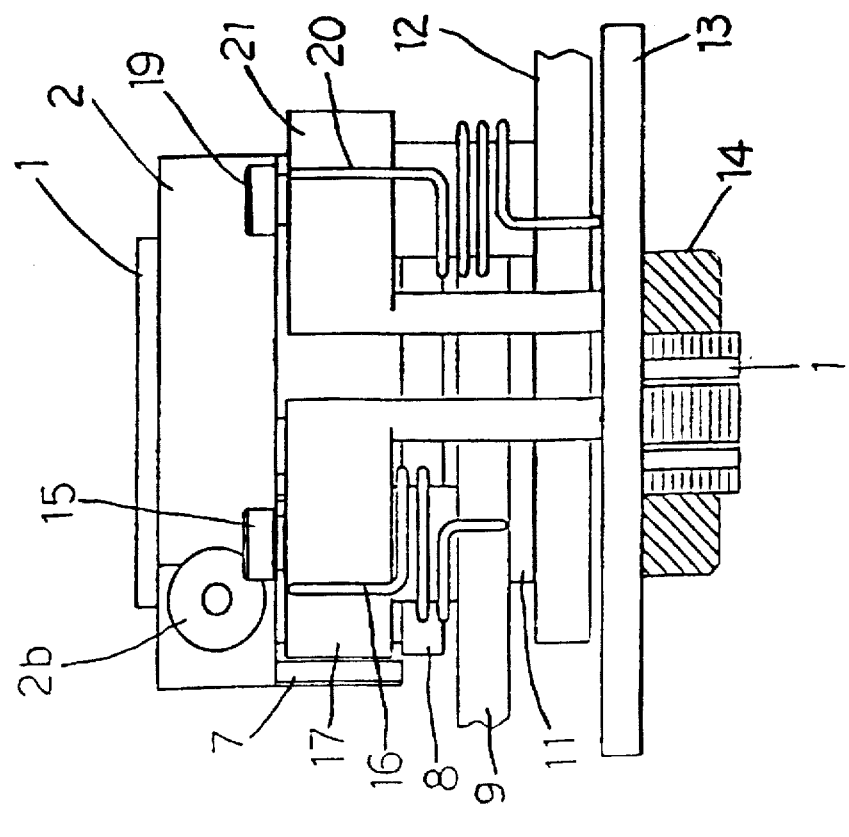
FIG. 3 is an assembly drawing of the present invention
Figure 2:
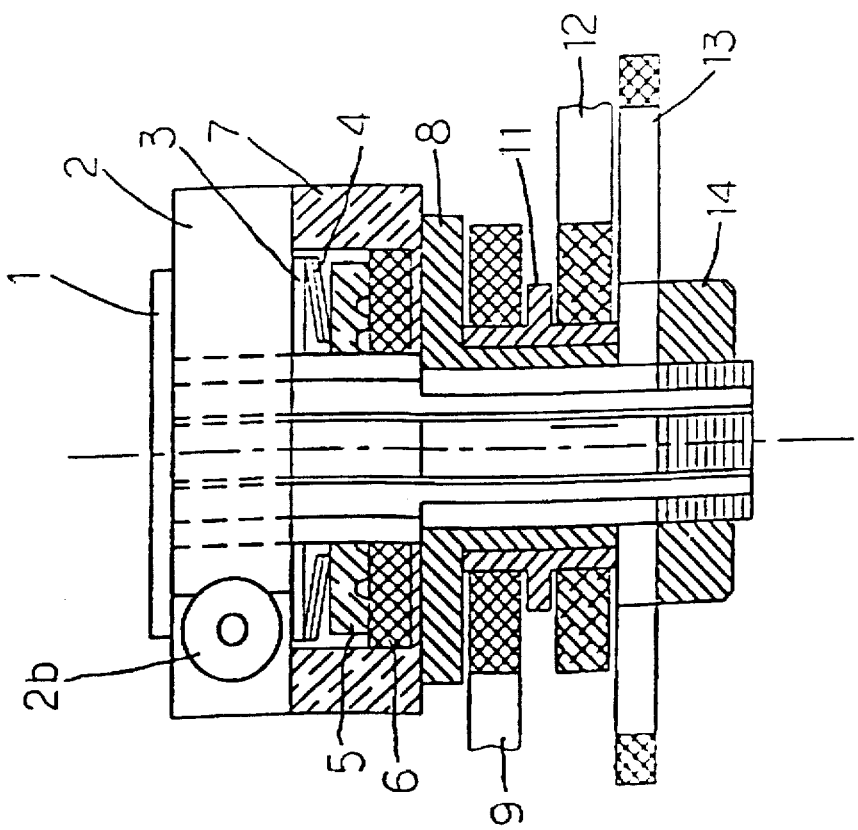
FIG. 2 is a longitudinally-sectional view of the present invention, showing the internal structure of the present invention.

The bicycle speed change lever apparatus of the present invention relates to the use of lever apparatus for the control of in and back shifts of the speed change apparatus. The lever apparatus has two levers 9, 12 with first and second clutch members 17, 21 respectively. The lever apparatus, when pushed by the rider will drive the ratchet member 7 on the fixed member 1 to move toward different direction, and the rotation of the ratchet member 7 will drive a cable-pulling member 2 in positive or negative rotation for tightening or relaxing a speed change control cable to link up the speed change apparatus producing speed change. Referring to FIG. 1, the members of the present invention are mounted on the fixed member 1, with a splined shaft 1a for connecting these members.

The cable-pulling member 2 is setting on the knob shaft 1a of the fixed member 1. The cable-pulling member 2 has a ting-shaped recess 2b around its circumference to allow the cable to wind and for the cable-pulling member 2 to rotate about a center axial line 30 reciprocally to specific angle positions to enable the cable (not shown) to drive the speed change apparatus to produce shifting a action. A flange 2a is perpendicularly extending from the end of the cable-pulling member 2 and the flange 2a is connected with the ratchet member 7 to attain a linking-up effect whereby the cable-pulling member 2 may move forward (in shift) or backward (back shift) to specific angular positions. A washer 3 is mounted between the cable-pulling member 2 and ratchet member 7 for protecting the cable-pulling member 2 against wearing, and it is jointly mounted with a position maintaining mechanism on the knob shaft 1a of the fixed member 1.

Figure 13:
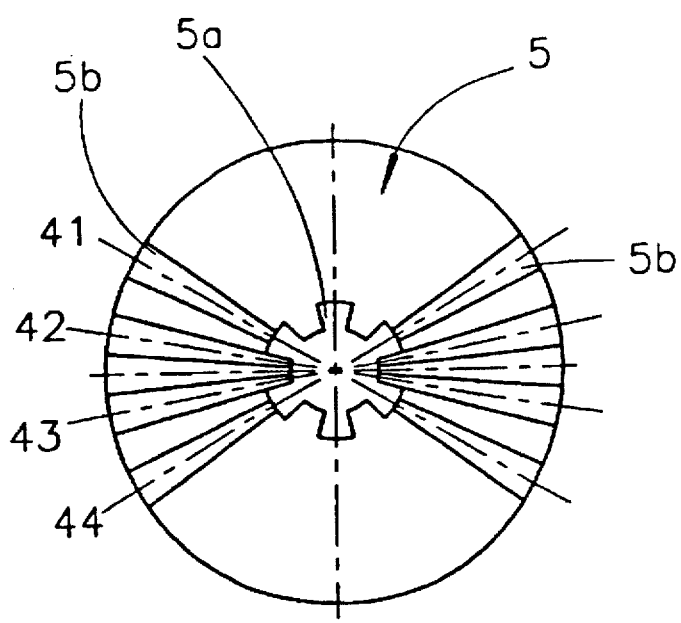
FIG. 13 is a front view of engaging portion of the present invention, showing the position of each recess at certain angle.

The position maintaining mechanism includes an engaging portion 5 and an engaging element 6. The center position of the engaging portion 5 has a spline 5a through which the splined shaft 1a of the fixed member 1 extends to allow only the axial movement along the splined shaft 1a without relative rotation. Referring to FIG. 13, the end of the engaging portion 5 has recesses 5b extending radially, and the recesses Sb may set together with the engaging member 6.

The engaging member 6 may also be rotatably mounted on the splined shaft 1a of the fixed member 1, and has a shoulder 6a on its circumference for connecting together with the ratchet member 7, whereby the engaging member 6 may be driven to rotate. A projection 6b is placed perpendicular to the end of the engaging member 6, and the spring 4 is connected to the end of the engaging portion 5 to maintain a proper thrust force between the latter and the engaging member 6, whereby they may be engaged tightly to prevent the engaging portion 5 from moving backward due to a pulling by the cable resulting in the skipping of shifting. With the assembly of the position maintaining mechanism, when the ratchet member 7 is rotated to a specific position, the projection 6b of the engaging member 6 may also be engaging with the recesses 5b of the engaging portion 5 step by step to attain positioning effect and therefore shifting operation may be guaranteed with accuracy.

Referring to FIG. 13, the recesses 5b of the engaging portion 5 resembles a ring arrangement around the center axial line 30. Therefore, when the projection 6b of the engaging member 6 is engaging with different recesses 5b, the engaging member 6, ratchet member 7 and cable-pulling member 2 are located at the preset angle positions (center lines 41–44 marked on FIG. 13) and therefore the cable-pulling member 2 may drive the speed change control cable producing different amount of expansion/shrinkage so as to position the speed change cable whereby the speed change apparatus may produce the action 6f shift.

Figure 4:
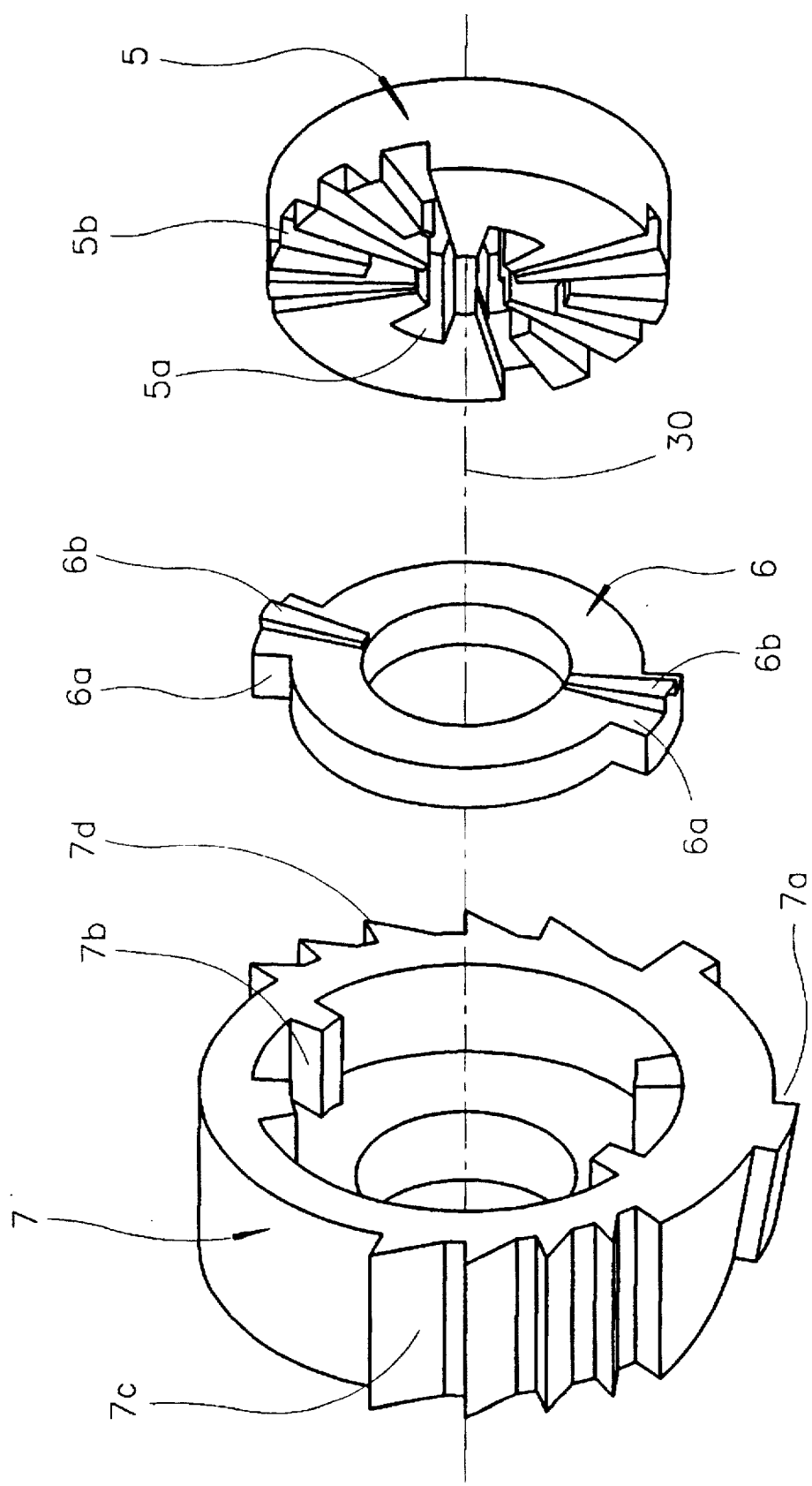
FIG. 4 is a partial view of position maintaining mechanism of the present invention, showing the engaging structure of position maintaining member.

Referring to FIGS. 1 and 4, the ratchet member 7 has a recess 7a connected to the shoulder 2c of the cable-pulling member 2, whereby the cable-pulling member 2 may be driven in rotation. A recess 7b is mounted beside the end of ratchet member 7, and the recess 7b is connected with the shoulder 6a of the engaging member 6, and reserve a gap 7e for rotation.

The recess 7b is dimensioned to fit the shoulder 6a of the engaging member 6 to drive the engaging member 6 to rotate to accomplish the purpose of accurate positioning and further to provide over shift necessary for the change of shift (to be described later).

A first clutch portion 7d and second clutch portion 7c are mounted around the circumference of the ratchet member 7. The first clutch portion 7c and second clutch portion 7d have recesses located around the center axial line 30 with which the second clutch member 17 and first clutch member 21 may be engaging so that the ratchet member 7 may rotate about the axial line.

The first clutch member 21 may be inserted in the first clutch portion 7d of the ratchet member 7 to push the ratchet in rotation. The first clutch member 21 has a through hole 21b near the axial line, and the hole 21b is provided for connecting with a shaft 19, and an end bar 21a perpendicular to the end of the first clutch member 21 is extending to a guide member 13 [while]so as to limit its travel.

The shaft 19 has an end portion 19c on the end, and the end portion 19c is located at the position for rotatably engaging with the through hole 21b of the first clutch member 21. And the end portion 19c has a buckle 22 to prevent the first clutch member 21 from slipping off. The shaft 19 has a shoulder 19b on the center portion and the shoulder 19b is provided for preventing the first clutch member 21 from departing from the top of the ratchet member 7. The other end of the shaft 19 has an end portion 19a, and the end portion 19a is provided for insertion in the hole 9a of a first lever 9, and the hole 9a is located on the end of the first lever 9 and deviate from the axial center of the first lever, enabling the first lever 9 when pushed to produce a moment for labor-saving operation.

The first lever 9 has a recess 9b, and the recess 9b is provided for holding tightly the retaining end 20a of an urging spring 20 mounted between the first lever 9 and the first clutch member 21. The other end of the urging spring 20 has a retaining end 20b, and the retaining end 20b pushes against the first clutch member 21, when the first lever 9 is pushed, the force of the urging spring 20 may force the first clutch member 21 engaging with the first clutch portion 7d of the ratchet member 7.

A hole is formed at the center axial position of the first lever 9 so the first lever 9 may be engaging with the sleeve 8. The sleeve 8 has a splined shaft 8a, provided for engaging with the knob shaft 1a of the fixed member 1 so that the sleeve 8 will not rotate at arbitrarily whereas the first lever 9 may rotate about the center axial line 30.

The first lever 9 has a hole 9c deviating from the center axial position, and the hole 9c is provided for receiving the retaining end 10b of the urging spring 10. The urging spring 10 also has the same retaining end 10b same as the retaining end 10a on the other end. The retaining end 10a is tightly holding a second lever 12, whereby the lever may return to the home position with the help of a recovery force from the urging spring 10 alter the motion completed.

The second lever 12 has a hole at the center axis engaging with a spacing ring 11. The spacing ring 11 also has a hole at the center axis and is connected with the sleeve 8. The end of the spacing ring 11 is holding the first lever S and circumference on the other end of the spacing 11 is provided for the second lever 12 whereby the second lever 12 may turn around on the spacing ring 11. A shoulder ha is formed on the middle portion of the spacing ring 11 to hold the second lever 12 whereby the second lever 12 may mm around on a fixed position. The second lever 12 has a projection 12c on the circumference retaining the retaining end 10a of the urging spring 10, whereby the second lever 12 can move around and return to the home position alter the motion completed.

The end of the second lever 12 away from the center axial line 30 has a hole 12a, and a side portion 12b of the second lever 12 which are the similar to those on the first lever to receive a shaft 15 and an urging spring 16. The end portion 15c of the shaft 15 is also mounted on a second clutch member 17. The second clutch member 17 has the same function and action as the first clutch member 21 but the direction of its pawl is reversed for engaging with the first clutch member 7c of the ratchet member 7 mounted on the circumference of the ratchet member 7, and the end 15c has a buckle 18 preventing the second clutch member 17 from slipping out.

The second clutch member 17 also has an end bar 17a perpendicular to the end of the second clutch member 17, and the end bar 17a also extends to the guide member 13.

Figure 5:
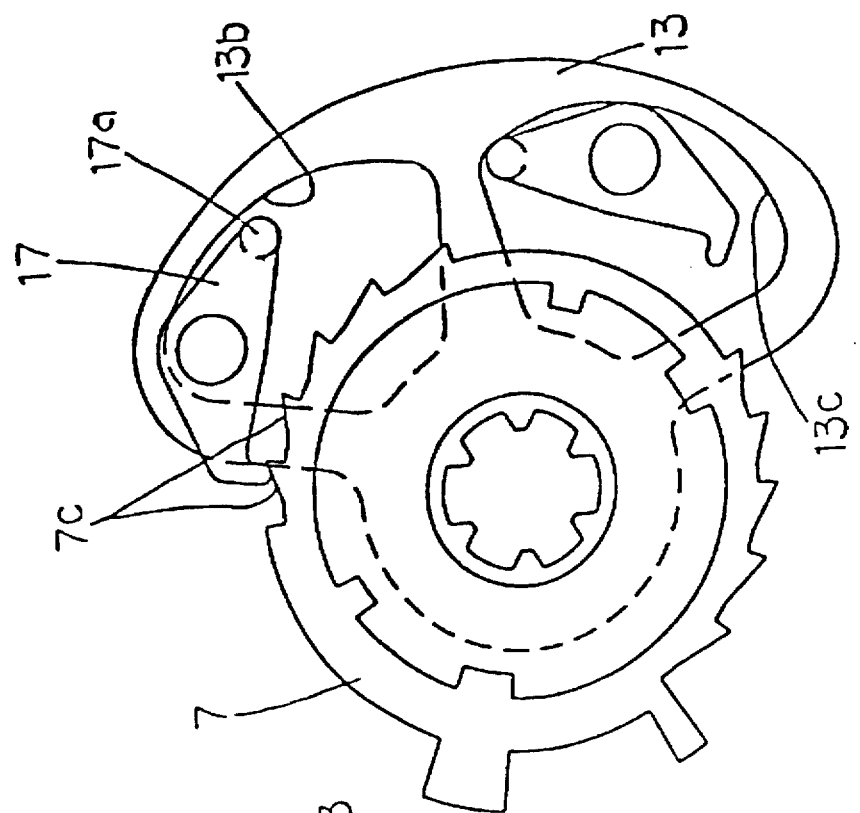
FIGS. 5 thru 7 are schematic drawings of continuous position relationship of the present invention for the control of in shift.

Referring to FIGS. 5 [thru]through 10, the guide member 13 guides the first and second clutch members 21, 17, when driven by the first and second levers 9, 12, moving forward or backward to engage with the ratchets 7d, 7c of the ratchet member 7, and the first and second clutch members 21, 17, disengage with the clutch portion id, 7c when the levers 9, 12 return to home position.

The guide member 13 has a splined shaft 13a on the center. The splined shaft 13a is fixedly inserted on the splined shaft 1a of the fixed member 1, and the circumference of the guide member 13 is connected to the limit portions 13b, 13c, each resembling an are recess. The limit portion 13b is provided for limiting the path of the end bar 17a of the second clutch member 17; and another limit portion 13c is for limiting the path of the end bar 21a of the first clutch member 21. The path length of the limit portions 13b, 13c is the length necessary for the change of shift through the speed change apparatus; the limit portions facing the forward or backward direction resemble an arc with greater curve radius whereby the end bars 17a, 21a will not be forced by the limit portions 13b, 13c whereby the first and second clutch members 17, 21 may move forward or backward and therefore the clutch members 21, 17 may cause the end bars 17a, 21a rising with the function of the urging springs 16, 20 but the head end is forced swinging down to engage with the clutch portions 7c, 7d, further to cause the first and second clutch members 17, 21 holding more tightly in order to prevent skip during the change of shift. The radius of the arcs of the limit portions 13b, 13c which approach the home positions of the first and second levers are smaller than the other portion of the radius of the said arcs of the limit positions 13b, 13c so that the first and second clutch members 21, 17 disengage with the ratchet member because the two end bars i7a, 21a can be pressed down by the limit portions 13b, 13c to push up the engaging end of the first and second clutch members 17, 21.

The function of the limit portions 13b, 13c, is to control the engagement of clutch members 17, 21 engaging with the ratchet member 7, whereby the clutch members 17, 21 may engage with the ratchet member 7 to prevent the clutch members 17, 21 and the ratchet member 7 from skipping during the change of shift.

The end of the splined shaft 1a of the fixed member 1 locks the members by means of a bolt 14.

Figure 6:
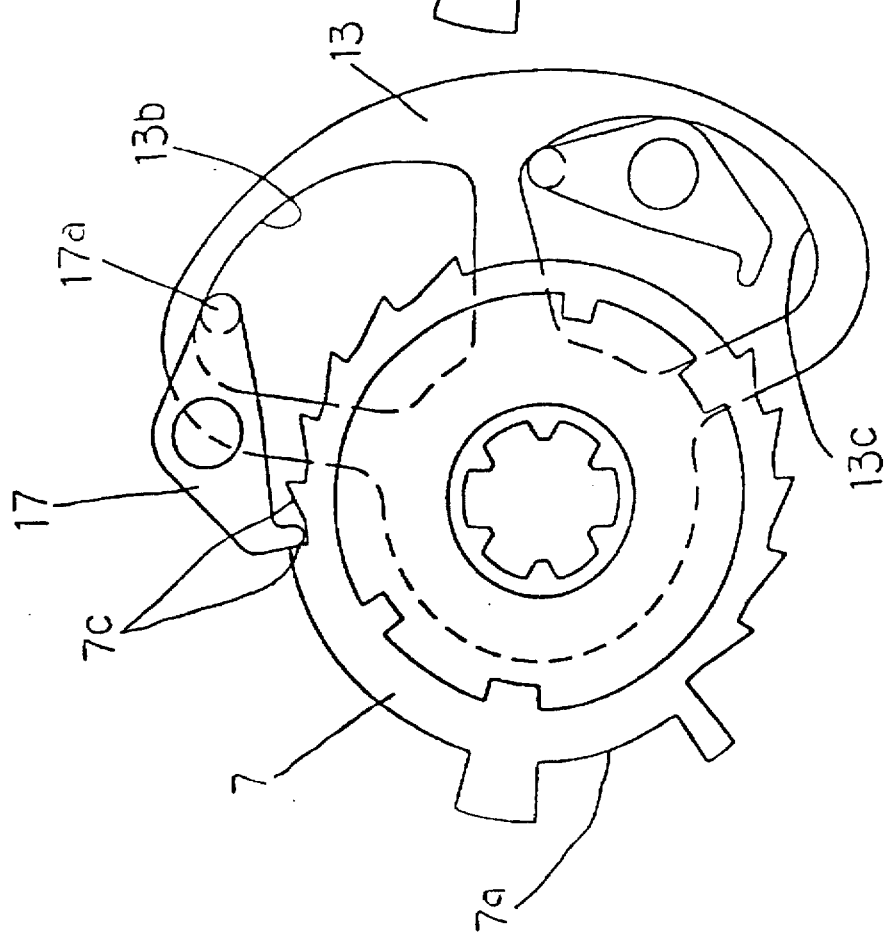
Figure 7:
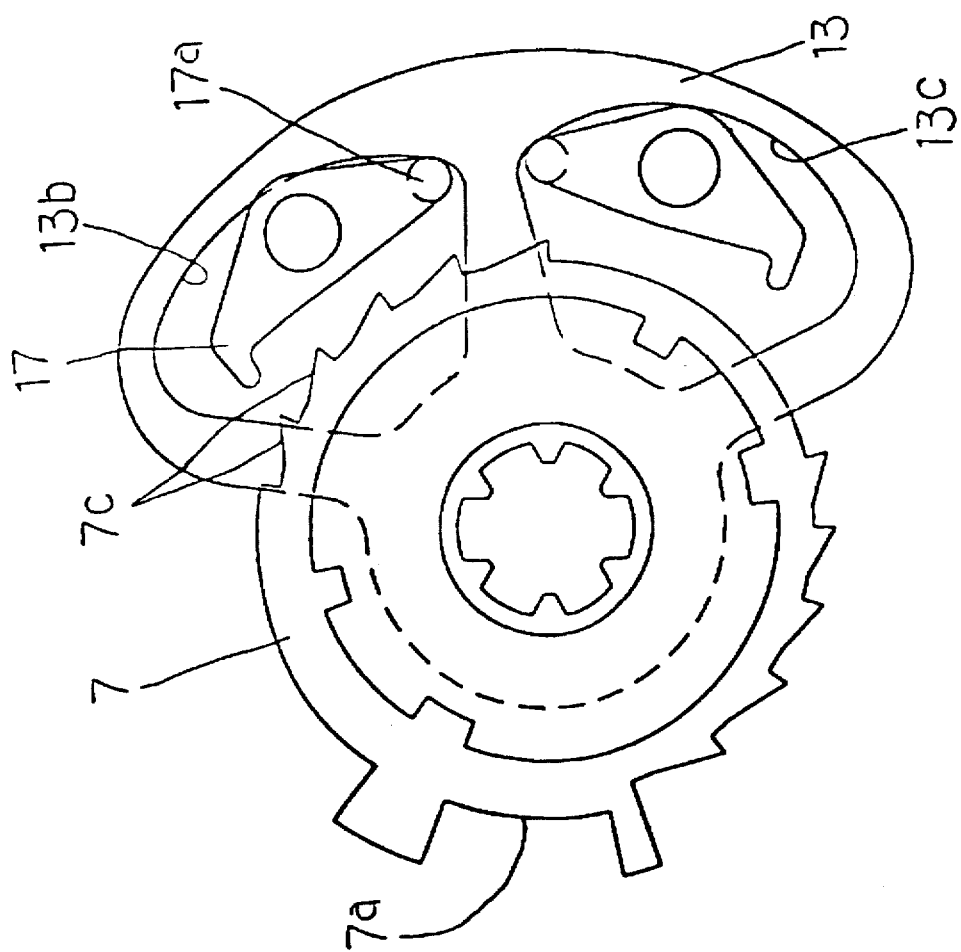

Referring to FIGS. 5 thru 7, based on the assembly above, when the second lever 12 turns to a specific position, the second clutch member 17 will engage with the clutch portion 7c of the ratchet member 7 along the path of limit portion 13b of the guide member 13 and push the ratchet member 7 in rotation, and the ratchet member 7 will drive the cable-pulling member 2 in rotation for tightening the cable to accomplish in shift. Upon completion of in shift, the recovery force of the urging spring 10 will push the second lever 12 back to home position, enabling the second clutch member 17 moving along the path of the limit portion 13b of the guide member 13 to disengage with the clutch portion 7c of the ratchet member 7.

Figure 10:
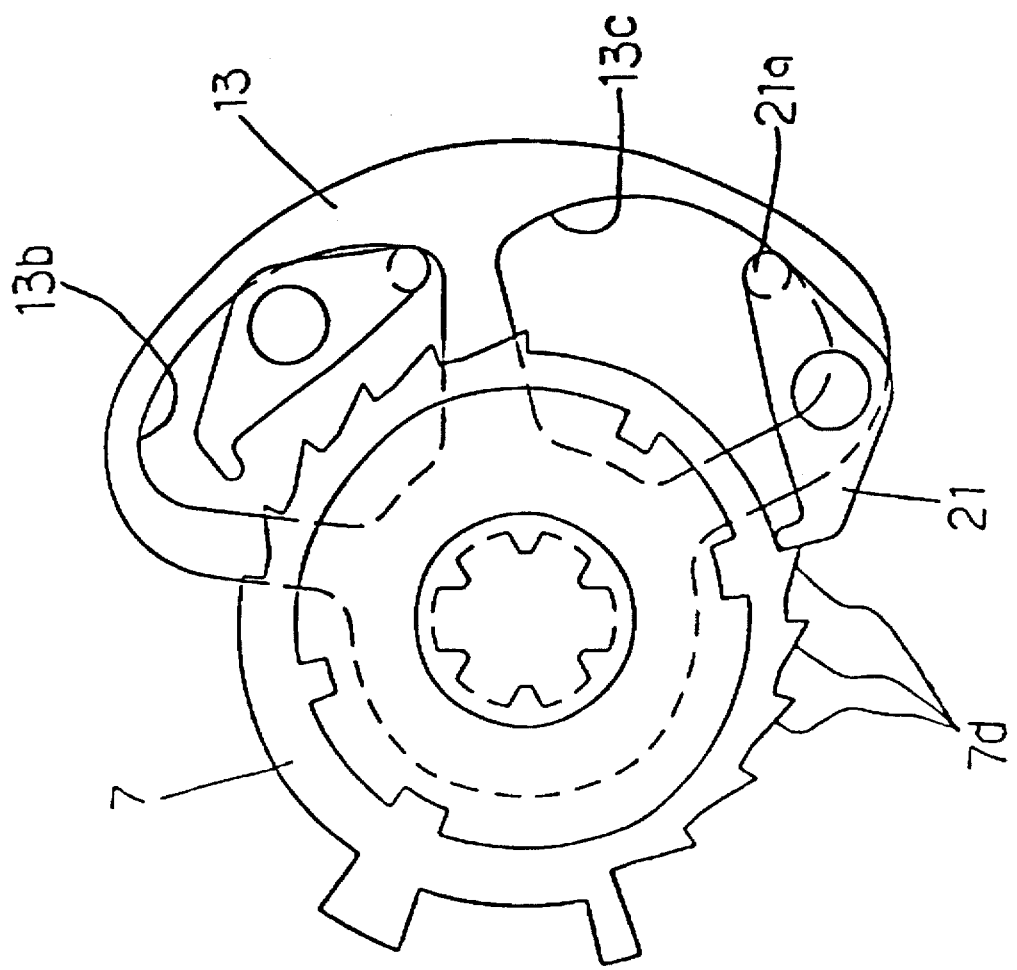
Figure 11:
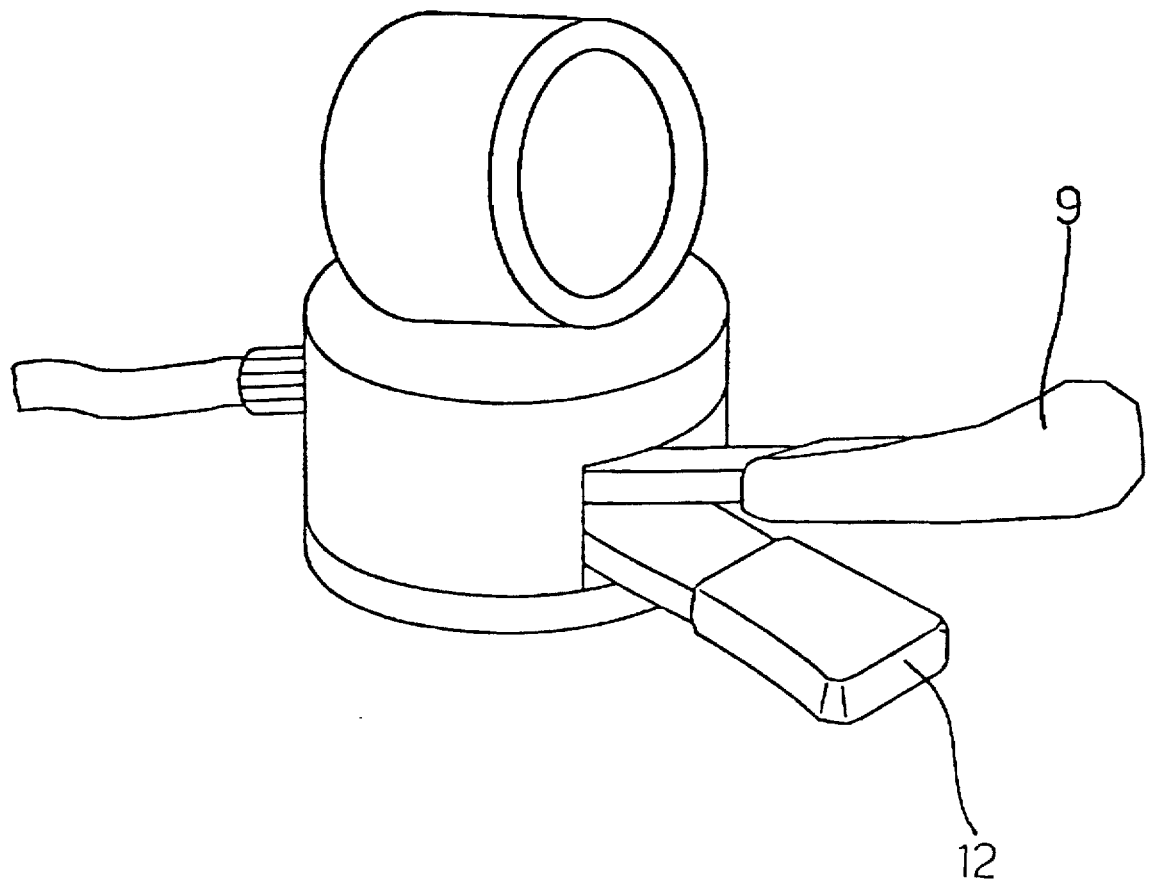
FIG. 11 is an elevational view of the appearance of the embodiment of the present invention.

Referring to FIGS. 8 thru 10, when the first lever 9 turns to a specific position, the first clutch member 21 will engage with the clutch portion 7d of the ratchet member 7 along the path of limit portion 13a of the guide member 13 and push the ratchet member 7 moving backward, and the ratchet member 7 will drive the cable-pulling member 2 moving backward to relax the cable so as to accomplish back shift. Upon completion of a back shift, urging spring 10 will push the first lever 9 back to the home position whereby the first clutch member 21 may be pushed to move along the path of the limit portion 13c of the guide member 13 to disengage with the clutch portion 7d of the ratchet member 7. And the engaging member 6 of position maintaining mechanism engaging with the engaging portion 5 may avoid skip after back shift.

The lever apparatus embodied by the two levers 9, 12 may also be mounted with one lever to accomplish the same effect.

Figure 12:
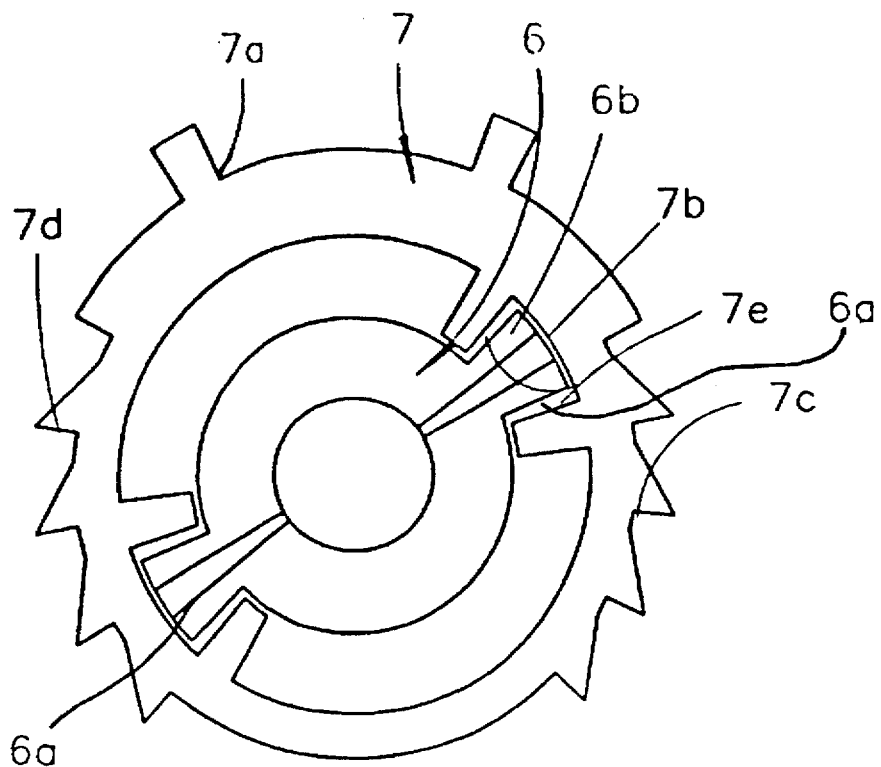
FIG. 12 is a schematic drawing of over shift of the embodiment, showing the over shift control relationship of the present invention.

Referring to FIG. 12, the engaging portion between the recess 7b of the ratchet member 7 and the shoulder 6a of the engaging member 6 allows an over shift. The width of the recess 7b of the ratchet member 7 is greater than the width on each side of the shoulder 6a of the engaging member 6, enabling the recess 7b of the ratchet member 7 and the shoulder 6a of the engaging member 6 to have a proper gap 7e.

When the user pushes the lever driving the ratchet member 7 to change shift, the ratchet member 7 will drive the cable-pulling member 2 in rotation by a small angle and tightly pulling the cable with a small displacement, and the side of the recess 7b of the ratchet member 7 will contact the side of the shoulder 6a of the engaging member 6, and then drive the engaging member 6 in rotation to the specific angle necessary to effectuate the change of shift. Upon completion of the change of shift, the speed change control cable will pull the cable-pulling member 2 and the ratchet member 7 turning back by a small angle, produce a small angle displacement so as to give an extra expansion during change of shift.

The extra expansion of the cable may produce an over shift whereby the speed change apparatus may produce a larger displacement during the change of shift so that the chain may precisely change and engage on the different sprocket wheel to accomplish accurate shift change. Upon completion of shift change, owing the pull force of the cable recovery, extra expansion will be eliminated while turn the cable-pulling member 2 and the ratchet member 7 back by the small displacement and back to the position of correct shift.

What is claimed is:

1. A speed change lever apparatus for changing bicycle speeds including:

a fixed member;

a cable-pulling member, which is mounted on said fixed member for reciprocally moving around a center axial line for driving said speed change control cable for producing a shift in bicycle speeds;

a position maintaining mechanism mounted on said fixed member to cause said cable-pulling member to be positioned at a predetermined angle position;

a ratchet member, which is rotatably mounted on said fixed member around said center axial line thereof and is connected to said cable-pulling member for driving said cable-pulling member and producing a rotation;

a lever apparatus having a first lever and a second lever, said lever apparatus being rotatably mounted on said fixed member around said center axial line, said first and second levers having a first clutch member and second clutch member, respectively, for engaging with said ratchet member while allowing said ratchet member to be driven by said first and second clutch members for rotation to produce a shift, said first lever turning to a direction for tightening said speed change control cable; said second lever turning to a direction for allowing said cable-pulling member to relax said speed change control cable; said first and second levers driving said cable-pulling member for completion of said shift change and return to home position;

a guide member having a first limit portion and a second limit portion; said first limit portion for guiding said first clutch member allowing it to engage with said ratchet member when said first lever moving toward said forward direction, when said first lever returning to home position, and disengaging from said ratchet member; said second limit portion for guiding said second clutch member to engage with said ratchet member when said second lever turning in a backward direction, and disengaging from said ratchet member when said second lever returning to a home position.

2. The speed change lever apparatus as claimed in claim 1 wherein said position maintaining mechanism including: an engaging portion having a plurality of recesses; and an engaging member for engaging with said recesses of said engaging portion.

3. The speed change lever apparatus as claimed in claim 2 wherein said ratchet member has a plurality of recesses; and said engaging member has a plurality of retaining members to be received in said recesses of said ratchet member.

* * * * *